United States Patent

Phillips et al.

[11] Patent Number: 5,822,089
[45] Date of Patent: Oct. 13, 1998

[54] GRAZING INCIDENCE HOLOGRAMS AND SYSTEM AND METHOD FOR PRODUCING THE SAME

[75] Inventors: Nicholas J. Phillips, Loughborough, United Kingdom; Zane Coleman, Mableton, Ga.

[73] Assignee: ImEdge Technology Inc., Yorktown Heights, N.Y.

[21] Appl. No.: 594,715

[22] Filed: Jan. 31, 1996

Related U.S. Application Data

[63] Continuation-in-part of Ser. No. 546,709, Oct. 23, 1995, Pat. No. 5,710,645, which is a continuation of Ser. No. 373,878, Jan. 17, 1995, abandoned, which is a continuation of Ser. No. 11,508, Jan. 29, 1993, abandoned.

[51] Int. Cl.$^6$ ........................................................ G03H 1/02
[52] U.S. Cl. ................................. 359/3; 359/34; 359/900
[58] Field of Search .................................. 359/1, 3, 4, 7, 359/13, 15, 27, 30, 32, 34, 35, 900; 430/1, 2

[56] References Cited

U.S. PATENT DOCUMENTS

| | | | |
|---|---|---|---|
| 4,400,616 | 8/1983 | Chevillat et al. | 235/487 |
| 4,451,412 | 5/1984 | Loiseaux et al. | 359/3 |
| 4,643,515 | 2/1987 | Upatnieks | 359/10 |
| 4,737,001 | 4/1988 | Moss | 359/34 |
| 4,888,260 | 12/1989 | Cowan | 359/3 |
| 5,121,229 | 6/1992 | Benton et al. | 359/1 |
| 5,151,800 | 9/1992 | Upatnieks | 359/34 |
| 5,260,149 | 11/1993 | Monroe et al. | 359/3 |
| 5,268,985 | 12/1993 | Ando et al. | 359/34 |
| 5,295,208 | 3/1994 | Caulfield et al. | 359/34 |
| 5,341,230 | 8/1994 | Smith | 359/34 |
| 5,402,514 | 3/1995 | Booth et al. | 385/37 |
| 5,455,693 | 10/1995 | Wreede et al. | 359/32 |
| 5,465,311 | 11/1995 | Caulfield et al. | 359/34 |

FOREIGN PATENT DOCUMENTS

| | | | |
|---|---|---|---|
| 3-168681 (A) | 7/1991 | Japan | 359/1 |

OTHER PUBLICATIONS

O. Bryngdahl, "Holography with Evanescent Waves", J.O.S.A., vol. 59, No. 12, pp. 1645–1650, Dec. 1969.

O. Bryngdahl, "Evanescent Waves in Optical Imaging", Progress in Optics IV, ed. E. Wolf, North Holland Publ., pp. 169–221, Jan. 1973.

N. J. Phillips, et al. "The Recording and Replay of True Edge–Lit Holograms", IEE Conf. Proc. Pub. No. 342, London, pp. 8–11, Sep. 1991.

Benton, et al. "Edge–Lit Rainbow Holograms", Proc. SPIE, 1212, pp. 149–157, 1990.

Phillips, et al., "Edge–Illuminated Holograms, Evanescent Waves, and Related Optical Phenomena", Proc. SPIE, 1600, pp. 18–25, 1991.

Farmer, et al. "The Application of the Edge–Lit Format to Holographic Stereograms", Proc. SPIE, 1461, pp. 1–11, 1991.

Upatnieks, "Edge–Illuminated Holograms", Applied Optics, vol. 31, No. 8, pp. 1048–1052, 1992.

(List continued on next page.)

Primary Examiner—Cassandra Spyrou
Assistant Examiner—John Juba, Jr.
Attorney, Agent, or Firm—Hopgood, Calimafde, Kalil & Judlowe, LLP

[57] ABSTRACT

A method and system for recording and displaying grazing-incidence (i.e., steep reference beam angle) holograms supported on a substrate having thin edge-illuminatable geometry. The system and process of the present invention uses thin edge-illuminated substrates that facilitate optimal coupling of the reference light beam at steep angles approaching grazing incidence, while maximizing the contrast of the slanted fringe structures thereof. A recording medium is in direct contact with a thin substrate whose refractive index is greater than the bulk refractive index of the recording medium. At the substrate interface, the recording medium has a gradient-type index matching region, created by exposure of the recording medium to reference beam illumination, prior to the further application of an object beam to create a fringe pattern.

5 Claims, 9 Drawing Sheets

OTHER PUBLICATIONS

Kubota, et al., "Method for Reconstructing a Hologram Using a Compact Device", Applied Optics, vol. 31, No. 23, pp. 4734–4737, 1992.

Ueda, et al., "Edge–Illuminated Color Holograms", Proc. SPIE, 2043, pp. 278–286, 1993.

Huang, et al., "Waveguide Holography and its Applications" Proc. SPIE, 1461, pp. 303–312, 1991.

Huang, et al., "Edge–Lit Reflection Holograms" SPIE vol. 1600 International Symposium on Display Holography, pp. 18–25, 1991.

Birner, "Steep Reference Angle Holography: Analysis and Application" Mass. Inst. of Tech., Master's Thesis, pp. 1–82, Feb. 1989.

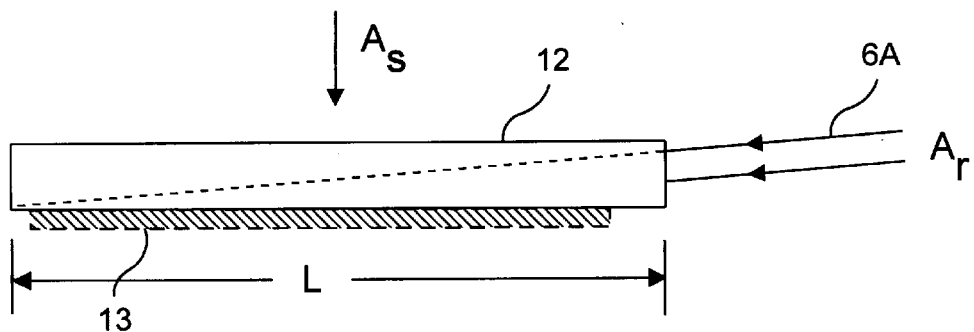
F I G. 2B
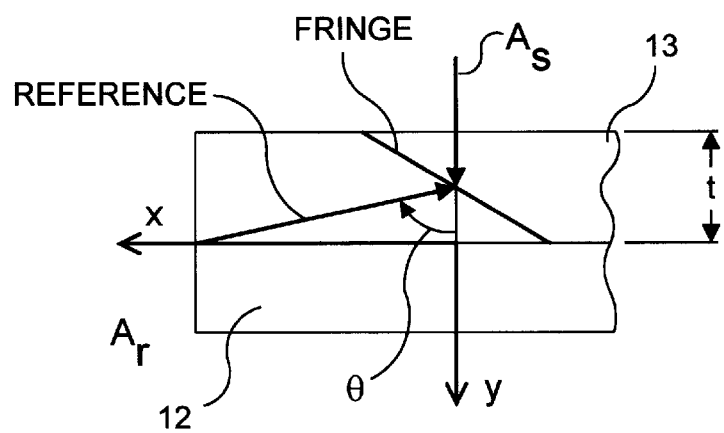
F I G. 3
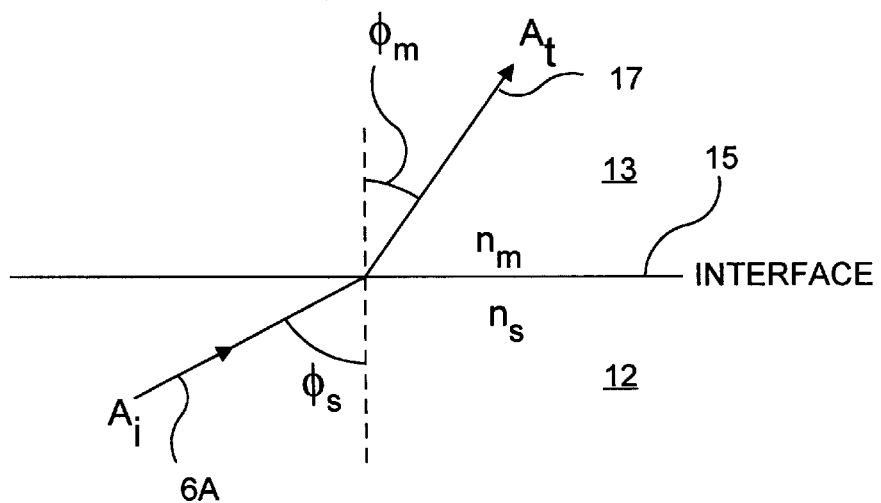
F I G. 4

GRAZING INCIDENCE HOLOGRAMS AND SYSTEM AND METHOD FOR PRODUCING THE SAME

RELATED CASES

This is a Continuation-in-Part of application Ser. No. 08/546,709 entitled "Grazing Incidence Holograms And System And Method For Producing The Same" filed on Oct. 23, 1995, and now U.S. Pat. No. 5,710,645, which is a Continuation of application Ser. No. 08/373,878 entitled "Edge Illuminated Holograms" filed on Jan. 17, 1995 now abandoned, which is a Continuation of application Ser. No. 08/011,508 entitled "Edge Illuminated Holograms" filed on Jan. 29, 1993, now abandoned, wherein each said Application is incorporated herein by reference in its entirety.

BACKGROUND OF THE INVENTION

1. Field of Invention

This present invention relates to grazing incidence (i.e. edge-reference) holograms with high fringe contrast, and a method and system for recording and playing back the same using a single pass, grazing incidence, reference beam.

2. Brief Description of Prior Art

Various types of holograms have been developed during the past half century. While transmission and reflection type holograms have enjoyed increasing popularity over the years, increasing attention is being given to grazing incidence (e.g., "edge-illuminatable" or "edge-referenced") type holograms. Grazing incidence as used herein will refer to a large, or "steep" angle of incidence with respect to the normal to an interface between two surfaces. The primary reason for the increasing interest in grazing incidence holograms is due to its compact geometry that lends itself to convenient use in diverse applications.

Consequently, when resorting to holographic recording techniques, the primary goal in many applications is to produce edge-illuminatable holograms having a very thin packaging or an ultra-compact overall geometry. However, when recording grazing incidence holograms, assumptions about usual recording constraints simply do not apply. This is because the geometry imposed on the recording substrate and reference beam during the recording process, inherently imposes major restrictions on the properties of the recording materials used. Moreover, unless such restrictions are satisfied, it is not possible to achieve high intensity transmission of light from the reference light source, through the recording substrate and into the recording medium, where the reference beam interferes with the object beam to create the desired interference pattern (i.e., fringes). An educated view of the problem is concisely presented in a recent paper entitled "Edge-illuminated Holograms" by Juris Upatnieks published in Volume 31, No. 8, Applied Optics, Mar. 10, 1992.

In the Upatnieks' paper entitled "Edge-illuminated Holograms," he states that the use of thin substrates and extremely steep reference beam angles is impractical, yet recognizes the need to match the indices of refraction between the recording substrate and the holographic recording medium. In an attempt to achieve such matching, Upatnieks teaches the use of a special index matching fluid or layers between the edge-illuminated substrate and the holographic recording medium. However, he fails to teach one skilled in the art, to what degree index matching is required in order to produce edge-lit holograms when using grazing incidence reference beam illumination.

Consequently, during playback of prior art edge-illuminated holograms constructed in accordance with his Upatnieks method, reconstructed objects recorded therein are not displayable with the degree of brightness achievable in conventional transmission and reflection type holograms. This fact has severely limited the practical applications to which grazing incidence holograms can be put.

Also, the methods known in the art for producing edge-referenced holograms are generally incapable of producing edge-referenced holograms with high fringe-contrast and light diffraction efficiency on Bragg due to the large absorptive, losses suffered by the reference beam during prior art holographic recording processes.

Thus, there is a great need in the art for an improved system and method of producing holograms with high fringe contrast, using very steep reference beam angles and/or very thin substrates, thereby enabling ultra-compact geometries while avoiding the shortcomings and drawbacks of prior art holographic recording systems and methodologies.

OBJECTS OF THE INVENTION

Accordingly, a primary object of the present invention is to provide an improved grazing-incidence (i.e., steep reference beam angle) hologram which, in addition to having thin geometry, overcomes the shortcomings and drawbacks of prior art edge-lit hologram constructions.

A further object of the present invention is to provide a novel system and process for recording and displaying steep reference angle holograms using thin edge-illuminated substrates that facilitate optimal coupling of the reference light beam at steep angles approaching grazing incidence.

A further object of the present invention is to provide a system and method for recording steep reference angle holograms using grazing-incidence reference beams in the edge-illuminated substrates and beam intensity ratios which maximize the light diffraction efficiency of the holograms at their Bragg angles of operation.

A further object of the present invention is to provide a system and method for playing-back such recorded holograms using a grazing-incidence reference beams in the edge-illuminated substrates.

A further object of the present invention is to provide a novel system and method for recording steep reference angle, holograms using steep angle reference beams optimally coupled to the recording medium in order to form high contrast fringes therein under various optical conditions.

A further object of the present invention is to provide a method and system for producing thin, steep reference angle holograms having high contrast fringes, wherein the difference in the indices of refraction between the recording material and its substrate is functionally related to the reference beam angle in the recording substrate and the level of light transmission from the substrate into the recording medium.

A further object of the present invention is to provide such a system and method of recording steep reference angle holograms, using a photopolymer recording medium having an index of refraction which is slightly less than the refractive index of the edge-illuminated substrate and which automatically matches to the substrate during the recording process to produce a gradient-type index matching region between the recording medium and the recording substrate.

A further object of the present invention is to provide a maximized fringe contrast model for use in producing high efficiency volume edge-referenced holograms using absorptive recording films (e.g. photopolymers).

A further object of the present invention is to provide a novel method of precise index matching which employs monitoring the increased fluorescence of exposed photopolymer in order to visually indicate penetration of the reference beam into the recording medium and the condition of gradient index matching.

A further object of the present invention is to provide a novel recording system for recording an edge-referenced volume hologram at a reference angle and/or wavelength which is different than the reference angle and/or wavelength used during replay.

These and further objects of the present invention will become apparent hereinafter and in the Claims to Invention.

SUMMARY OF THE INVENTION

According to one of the broader aspects of the present invention, a novel system and process are provided for recording and displaying holograms using thin substrates and the reference light beams directed at steep angles approaching grazing incidence.

In accordance with the present invention, the system can be used to holographically record high contrast fringes in a holographic recording medium utilizing very steep reference beam angles, approaching grazing incidence conditions. In general, the recording system comprises a substrate of thin construction, a holographic recording medium, a laser light source, a laser beam splitting means, and object and reference beam directing means. Holographic recording systems of various configurations and geometry are disclosed for recording edge-referenced holograms according to the principles of the present invention. In each such embodiment, the substrate is made from an optically transparent material having an index of refraction of $n_s$, and front and rear surfaces disposed substantially parallel to each other and an edge surface disposed substantially perpendicular to the front and rear surfaces.

The holographic recording medium has front and rear surfaces, with the rear surface of the holographic recording medium being disposed in contact with the front surface of the substrate along an interface of substantially planar geometry. The function of the laser light source is to produce a laser beam. The function of the laser beam splitting means is to split the produced laser beam into an object beam for propagation along a first optical path, and a reference beam for propagation along a second optical path. The function of the polarization means is to impart a predetermined polarization state to both the object beam and the reference beam as the object beam and reference beam propagate along the first and second optical paths, respectively. The function of the object beam directing means is to direct the object beam towards the holographic recording medium so that it propagates through the front surface thereof and into the holographic recording medium. The function of the reference beam directing means is to direct the reference beam into the substrate at a steep angle of incidence with respect to the normal of the interface so that the reference beam propagates through the interface and enters the recording medium and interferes with the object beam so as to form fringes in the holographic recording medium.

The system and method of the present invention can be used to optimally couple the reference beam into a recorded hologram during playback (i.e., display). However, during the holographic recording process of the present invention, optimal coupling of the reference laser beam from the edge-illuminated substrate into the holographic recording medium is best carried out using methodologies that are dependent on the relative difference between the indices of refraction of the substrate and recording medium. Thus, two methods of holographic recording are presented. In the first case (i.e., Case 1), the index of refraction $n_s$ of the substrate is less than or equal to the index of refraction $n_m$ of the recording medium. In the second (i.e., Case 2), the index of refraction $n_s$ of the substrate is greater than or equal to the index of refraction $n_m$ of the recording medium.

In the first case, the holographic recording medium is made from an optically transparent material having an index of refraction $n_M$ greater than $n_s$ with the difference in index of refraction, $n_m-n_s$ therebetween being equal to $\Delta n$. In the first case, it has been discovered that for a given level of reference beam transmission from the recording substrate to the recording medium, the reference beam angle in the recording substrate is functionally related to the difference in the indices of refraction between the recording material and its substrate and a preselected intensity transmittance. Advantageously, this functional relationship provides a solution to the problem of optimally coupling the reference beam into the holographic recording medium at steep angles of incidence, and thus provides a practical way of achieving (i.e., forming) fringes with high contrast in the holographic recording medium under such recording conditions. During playback, this relationship also provides a solution to the problem of coupling the reference beam from an edge-illuminatable substrate into the pre-recorded hologram.

In the second case, where the index of refraction of the recording medium is less than the index of refraction of the recording substrate, the holographic recording system and process of the present invention achieves optimal refractive-index matching using a holographic recording medium containing photopolymerizable monomers (i.e., photomonomers) that are free to migrate within the medium in response to light exposure. During the holographic recording process, the photopolymer is exposed to an object beam from one side thereof, and simultaneously to a reference beam passing directly through the substrate at grazing incidence to the interface between the photopolymer and the substrate. In response to the production of an evanescent field present at the substrate-medium interface, the photomonomer in the photopolymer recording medium migrates (i.e., diffuses) towards the interface. This migration action locally increases the index of refraction adjacent the interface, creating a self-induced gradient-type index matching region between the recording layer and the substrate. Thus, in the case where the index of refraction of the substrate is greater than the recording medium, the method and system of the present invention provides a practical way of producing true grazing incidence, edge-illuminatable holograms which do not: require the use of special index matching layers, characteristic of prior art edge-lit holograms and recording methodologies heretofore.

According to another aspect of the present invention, a system and method are provided for making edge-referenced holograms having high-contrast fringe structures, with light diffraction efficiencies optimized at the their Bragg angle of operation.

In addition, a novel holographic recording system and complementary replay system are disclosed. This Recording System ensures that the spatial-intensity of the object and reference beams is substantially uniform within the recording medium during recording, thereby improving the light diffraction efficiencies characteristic of grazing incidence volume holograms produced therefrom.

These and other advantages of the present invention will become apparent hereinafter.

BRIEF DESCRIPTION OF THE DRAWINGS

For a complete understanding of the Objects of the Present Invention, the following Detailed Description of the Illustrative Embodiments should be read in conjunction with the accompanying Drawings, wherein:

FIG. 2B is a schematic diagram showing the geometry of the substrate of the transmission-type grazing-incidence hologram of the present invention, as well as the minimal angle of attack of a reference laser beam launched from the edge of the holographic structure into the substrate, indicated by $\tan \phi_s = L/t$;

FIG. 3 is a geometrical optics diagram showing the interference of the reference beam and object beam during the recording of the slanted fringe structures in the grazing-incidence holograms of the present invention;

FIG. 4 is schematic diagram illustrating the interfacial refraction which occurs at the interface between the substrate and recording medium of the grazing-incidence hologram of the present invention, for the case where the index of refraction of the recording medium $n_m$ is greater than the index of refraction for the hologram substrate $n_s$;

DETAILED DESCRIPTION OF THE ILLUSTRATIVE EMBODIMENTS

Production of successful holograms with high fringe-contrast in the edge-illuminated (i.e. "edge-referenced") geometry requires careful recognition of the important relationship between the refractive indices of the recording material and its substrate, as well as the ratio of the amplitude of the reference beam to the amplitude of the object beam interfering in the recording medium. In practice, the matching requirements of these refractive indices are very stringent and either impractical or impossible to achieve in a simple non-fussy manner. Ideally, the goal is to use for the substrate and recording medium, materials having identical indices of refraction. However, this is typically not achievable in practice for various reasons. Thus, it is to the practical realities of index matching that the present invention responds.

The system and method of the present invention provides a novel way of making grazing incidence holograms of either the transmission or reflection type, under non-ideal (i.e., practical) optical conditions, namely: using (i) recording media and substrates having different indices of refraction; and (ii) reference beams having steep angles of incidence, approaching grazing incidence, yet achieving optimal coupling of the reference beam into the recording medium in order to produce high contrast fringes in the recording medium.

When contemplating the construction of transmission or reflection type edge-referenced holograms, there nevertheless are two cases to consider during the holographic recording process of the present invention. The first case (Case 1) is where the index of refraction of the edge-illuminated substrate $n_s$ is less than the index of refraction of the recording medium $n_m$. The second case (Case 2) is where the index of refraction of the edge-illuminatable substrate $n_s$ is greater than the index of refraction of the recording medium $n_m$. These holographic recording processes will be described in great detail after describing the holographic recording system of the present invention, and the geometrical constraints and recording conditions that should be satisfied in order to produce grazing incidence holograms with high contrast fringes.

Figure 1A:
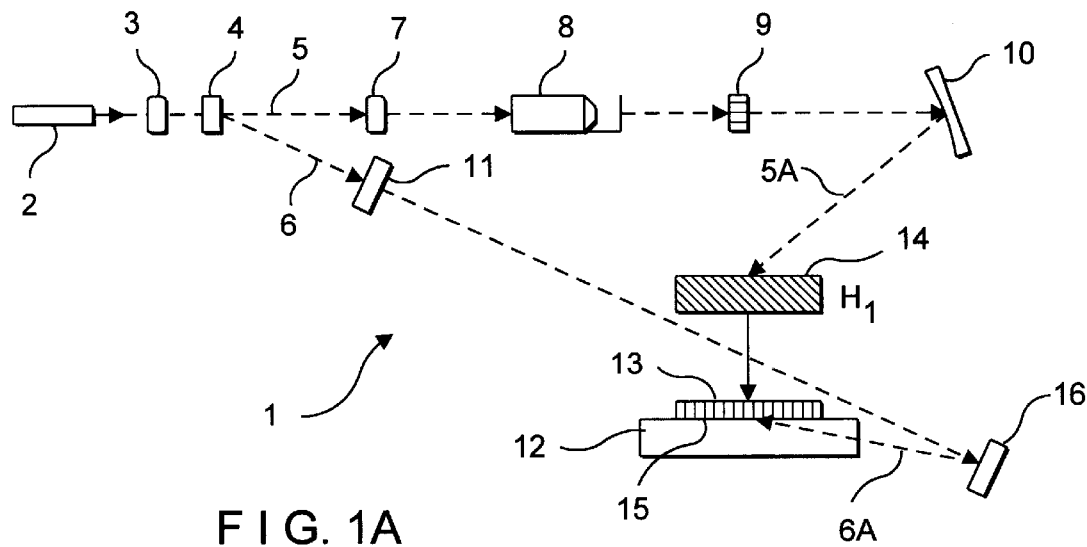
FIG. 1A is a schematic diagram of the recording system used to record reflection-type grazing-incidence holograms in accordance with the principles of the present invention.
Figure 1B:
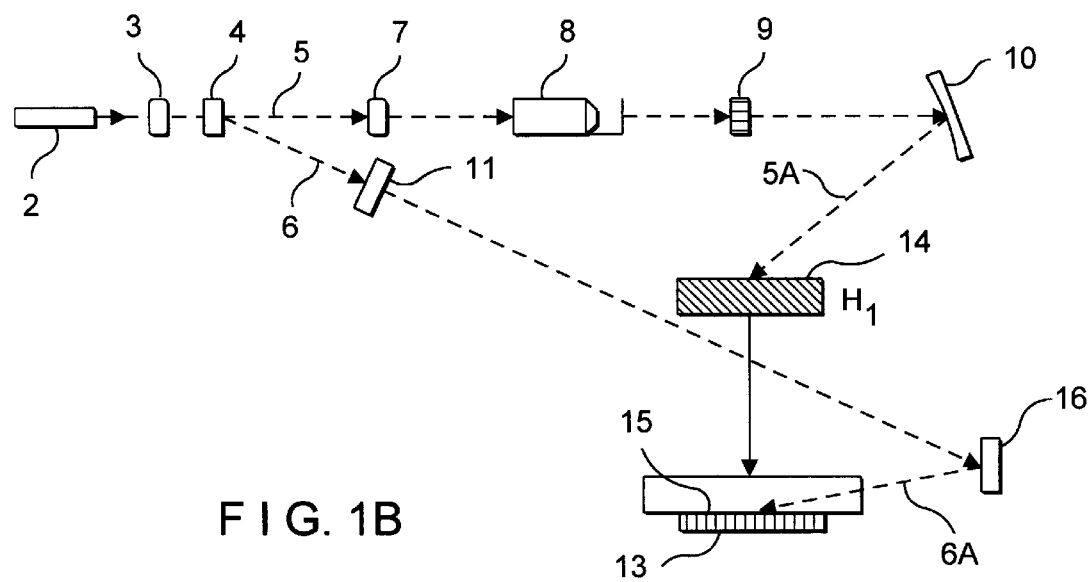
FIG. 1B is a schematic diagram of the recording system used to record transmission-type grazing-incidence holograms in accordance with the principles of the present invention.

As shown in FIGS. 1A and 1B, the holographic recording system 1 of the present invention comprises an exemplary arrangement of optical and electro-optical components, namely: a laser source 2 for producing a laser beam of required output: power; a ½ wave plate 3 for rotating the polarization state of the output laser beam so as to impart a predetermined beam-ratio to the object and reference beam intensities; a polarizing beam splitter 4 for splitting the laser beam into two polarized laser beams, i.e., an object beam 5 and a reference beam 6 having an S-polarization state, directed along first and second optical paths, respectively; a second ½ wave plate 7, disposed along the first optical path for imparting the object beam with the same polarization imparted to the reference beam 6; a low-pass spatial filter (LPSF) 8, disposed along the first optical path, for expanding the object beam and eliminating high spatial frequency noise; an anti-Gaussian filter 9, disposed along the first optical path, for rendering the object beam with a uniform intensity profile; a spherical collimating mirror 10, disposed along the first optical path, for collimating the light rays of the object beam to produce a collimated object beam 5A; a cylindrical lens 11, disposed along the second optical path, for shaping the reference beam; a cylindrical collimating mirror 12, disposed along the second optical path, for collimating the light rays of the reference beam passing through cylindrical lens 11, and directing the collimated reference beam 6A into the edge portion of optically transparent substrate 12, upon which holographic recording medium 13 is disposed. As shown in FIGS. 1A and 1B, the region over which the recording medium contacts or engages the support substrate shall be referred to as the substrate medium interface 15.

In the illustrative embodiments shown in FIGS. 1A and 1B, an "object" is recorded in the recording medium 13 supported upon the edge-illuminated substrate 12. In this exemplary embodiment, the object is a holographic image of a toy truck previously recorded in transmission hologram (H1) 14 as shown. In-the recording system depicted in FIGS. 1A and 1B, a cylindrical mirror 16 is used to diverge the reference beam. The reason for using this cylindrical mirror is that during, replay, a small light source will typically be placed at a short distance from the edge of the substrate in order to playback the virtual (non-conjugate) image of the recorded object. It is understood, however, that either the real or virtual image of the hologram can be played back by simply illuminating the respective side of the hologram during replay.

Figure 2A:
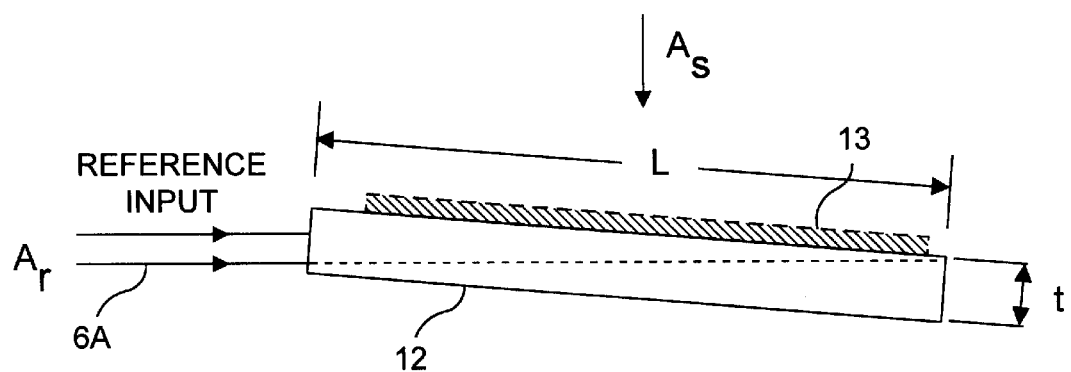
FIG. 2A is a schematic diagram showing the geometry of the substrate of the reflection-type grazing-incidence hologram of the present invention, as well as the minimal angle of attack of a reference laser beam launched from the edge of the holographic structure into the substrate, indicated by $\tan \phi_s = L/t$.

When the system of FIG. 1A is used to record a reflection-type edge-referenced hologram, the object beam is either passed directly through the holographic recording medium 13 supported upon the substrate 12 (i.e. when recording light diffractive gratings), or first off an object (e.g. through a transmission hologram H1) so as to modulate the wavefront thereof prior to passing through the holographic recording medium 13. At the same time, the reference beam 6 is directed through the edge of the substrate 12 and travels through the opposite side thereof in a single-pass, grazing incidence manner, as best shown in FIG. 2A, to interfere with the object beam and create a slanted fringe pattern which is recorded therein.

When the system of FIG. 1B is used to record a transmission type edge-referenced hologram, the object beam is either passed directly through the holographic recording medium 13 supported upon the substrate 12 (i.e. when recording light diffractive gratings), or first off an object (e.g. through a transmission hologram H1) so as to modulate the wavefront thereof prior to passing through the holographic recording medium 13. At the same time, the reference beam 6 is directed through the edge of the substrate 12 and travels through same side thereof as the object beam, in a single-pass, grazing incidence manner, as best shown in the reflection setup of FIG. 2A, to interfere with the object beam and create a slanted fringe pattern which is recorded therein.

While an image bearing hologram H1 is used as a physical "object" to modulate the object beam 5A in the illustrative, embodiments described above, it is understood, however, that the wavefront of the object beam need not be phase and/or amplitude modulated by any sort of object, but may be simply produced from an optical system comprising light refractive, diffractive and/or reflective elements.

When using the system and method of the present invention to record grazing incidence holograms, it is preferred that significant geometrical restrictions are imposed on the polarization of the recording light. It has been discovered that the use of P-mode polarized recording light will unavoidably result in true negation of fringe contrast and orange-peel fringes in the edge-referenced hologram H2. One may avoid "orange peel" fringes by restricting both the object and reference beams to S-mode polarization during holographic recording. When bi-refringent base material is used to back the recording layer 13 (e.g., silver halide film on a Mylar base, or DuPont photopolymer on a Mylar base), conventional measures should be taken to avoid variations in fringe contrast in the H2 copy hologram which can arise due to variations in polarization across the angular spectrum of waves from the master hologram H1. When using the system and method of the present invention to record grazing incidence holograms, conventional measures should be taken to minimize reflections from the air-recording medium interface. Also, when recording grazing incidence holograms using the system and method of the present invention, care should be undertaken to suppress the partial reflections off the recording layer using known measures. Failure to suppress such reflections will lead to intolerable 'orange peel' cosmetics in the recorded hologram.

Optimizing the Fringe-Contrast of Edge-Referenced Holograms Constructed Using Photopolymers Production of edge-referenced holograms with maximum light diffraction efficiency on Bragg requires optimization of the fringe-contrast thereof during the holographic recording process. The light diffraction efficiency of volume light diffraction holograms is expressed, as a function of incidence angle, modulation depth $\Delta n$, and recording media losses), as described in great detail in the celebrated paper entitled "*Coupled Wave Theory for Thick Hologram Gratings*" by Herwig Kogelnik, published in The Bell System Technical Journal (BSTJ), Volume.8, Number 9, at Pages 2909–2947, in November 1969, incorporated herein by reference.

The general approach to maximizing light diffraction efficiency on Bragg adopted by the method of the present invention is to model the interaction of the reference and object (i.e. signal) beams within the substrate and recording medium, and determine therefrom the optimal conditions at which the ratio of the reference signal amplitude and signal amplitude maximizes the fringe contrast.

In FIG. 3 the general case of an edge-referenced hologram is shown being recorded with the object (i.e. the signal) beam directed incident normal to the recording film, while the reference beam is directed at a very steep grazing angle through the substrate. Using the schematic diagram of FIG.

3, mathematical expressions for the reference and signal waves can be expressed as follows:

$$A_s e^{ik_m y - \alpha(y+t)} \text{ and } A_r e^{-ik_m x \sin\theta + \frac{\alpha y}{\cos\theta}} \quad (1)$$

These expressions represent the signal and reference waves respectively with $A_s$ and $A_r$ as the signal and reference amplitudes, $\alpha$ the absorption coefficient of the recording medium, $k_m$ the wave propagation constant in the recording medium, and $\theta$ the internal angle which the reference beam makes with surface normal vector inside the recording emulsion. The total amplitude at any point in the hologram can be described by the expression:

$$A_{tot} = A_s e^{ik_m y - \alpha(y+t)} + A_r e^{-ik_m x \sin\theta + \frac{\alpha y}{\cos\theta}} \quad (2)$$

and the intensity thereof can be expressed as:

$$I = A_{tot} \times A_{tot}^* = A_s^2 e^{-2\alpha(y+t)} + A_r^2 e^{\frac{2\alpha y}{\cos\theta}} + 2 A_s A_r e^{-\alpha(y+t) + \frac{\alpha y}{\cos\theta}} \times \cos(k_m y + k_m x \sin\theta) \quad (3)$$

As "contrast" within the recording medium is defined as $$C = \frac{I_{max} - I_{min}}{I_{max} + I_{min}}, \quad (4)$$

the fringe contrast for any point within the hologram can be expressed as:

$$C = \frac{2 A_s A_r e^{-\alpha(y+t) + \frac{\alpha y}{\cos\theta}}}{A_s^2 e^{-2\alpha(y+t)} + A_r^2 e^{\frac{2\alpha y}{\cos\theta}}} \quad (5)$$

This mathematical expression can be simplified by multiplying the numerator and denominator by the factor $$e^{\alpha y - \frac{\alpha y}{\cos\theta} + \alpha t},$$

to provide an alternative expression for fringe contrast:

$$C = \frac{2 A_s A_r}{A_s^2 e^{-\alpha y - \alpha t - \frac{\alpha y}{\cos\theta}} + A_r^2 e^{\alpha y + \alpha t + \frac{\alpha y}{\cos\theta}}} \quad (6)$$

In order to derive a mathematical expression for the average contrast within the recording medium, $$<C> = \frac{\int_{-t}^{0} C \, dy}{t},$$

several equivalences are made, namely $$z = e^{\alpha y + \alpha t + \frac{\alpha y}{\cos\theta}} \text{ and } \frac{dz}{dy} = \alpha \left( 1 + \frac{1}{\cos\theta} \right) z,$$

allowing Expression No. (6) above to be rewritten as:

$$<C> = \frac{1}{\alpha t \left( 1 + \frac{1}{\cos\theta} \right)} \int \frac{e^{\alpha t}}{e^{-\alpha t} \frac{2 A_s A_r}{\cos\theta} A_s^2 + A_r^2 z^2} \, dz. \quad (7)$$

The above expression can be further simplified by substituting $$\xi = \frac{A_r}{A_s} z \text{ and } d\xi = \frac{A_r}{A_s} dz$$

to provide the intermediate expression:

$$<C> = \frac{2}{\alpha t \left( 1 + \frac{1}{\cos\theta} \right)} \int_{\frac{A_r}{A_s} e^{-\alpha t}}^{\frac{A_r}{A_s} e^{\alpha t}} \frac{1}{1 + \xi^2} d\xi \quad (8)$$

When the simple integration expressed above encompasses the width of the recording medium where signal absorption occurs, the following expression is obtained for the average fringe contrast within the recording medium:

$$<C> = \quad (9)$$

$$\frac{2}{\alpha t \left( 1 + \frac{1}{\cos\theta} \right)} \left[ \tan^{-1}\left( \frac{A_r}{A_s} e^{\alpha t} \right) - \tan^{-1}\left( \frac{A_r}{A_s} e^{\frac{-\alpha t}{\cos\theta}} \right) \right]$$

In order to determine the beam ratio $A_r/A_s$ which will maximize the average fringe contrast throughout the recording medium, the first derivative of the above mathematical expression is taken with respective to the expression for the beam ratio to provide the following mathematical expression:

$$\frac{d<C>}{d\left( \frac{A_r}{A_s} \right)} = \quad (10)$$

$$\frac{2}{\alpha t \left( 1 + \frac{1}{\cos\theta} \right)} \left[ \frac{e^{\alpha t}}{1 + \left( \frac{A_r}{A_s} e^{\alpha t} \right)^2} - \frac{e^{\frac{-\alpha t}{\cos\theta}}}{1 + \left( \frac{A_r}{A_s} e^{\frac{-\alpha t}{\cos\theta}} \right)^2} \right]$$

Setting the above Expression (10) equal to zero provides an expression for a maximum average fringe contrast occurring at the beam ratio given by the expression:

$$\frac{A_r^2}{A_s^2} = \frac{e^{\alpha t \left( 1 + \frac{1}{\cos\theta} \right)} - 1}{e^{2\alpha t} - e^{\alpha t \left( 1 - \frac{1}{\cos\theta} \right)}} \quad (11)$$

Notably, in the case of no absorption, the beam ratio goes to 1 (i.e.

$$\lim_{\alpha \to 0} \frac{A_r^2}{A_s^2} = 1)$$

as one would expect.

Since the beam ratios $A_r^2/A_s^2$ is a direct indication of the measured intensity ratios within the recording medium, the method of holographic recording according to the present invention employs this relationship to predict the optimum beam ratio for achieving maximum average contrast during the recording of edge-referenced holograms.

Below is described a general method for determining an optimal value for the beam ratio, provided that a particular recording medium and set of recording parameters are known. The first step of the method involves determining the absorption constants of the recording medium. This can be achieved by analyzing the sensitivity characteristics of the recording media (e.g. photopolymers) being used. After ascertaining the absorption constants of the recording medium, the mathematical expression set forth in Expression No. (11) above is parameterized using the ascertained absorption constant and the known internal angle of incidence of the reference beam. The parameterized expression is then plotted as a function of beam ratio, and from the resulting plot, the optimal value therefor can be readily determined and used to control the amplitude of incident reference and signal (i.e. object) beams illustrated in the recording systems of FIGS. 1A and 1B. For example, polarizers, phase retardation plates, electro-optical modulators, neutral-density filters and/or other optical means can be used along the optical paths of these systems to control the amplitude of these beams so that the optimal beam ratio $A^2_r/A^2_s$ is realized within the recording emulsion during the recording process.

The "fringe contrast optimization" technique described above is most advantageous when recording edge-referenced holograms. This is because the path length of the reference beam in edge-referenced hologram is substantial, and so too are the absorptive losses occurring therein during the recording process. The technique described above provides a simple, yet effective way in which to ensure that the optimal beam ratio is used during the recording process, for producing edge-referenced holograms having high contrast slanted fringe structures.

Matching Indices of Refraction Between Substrate and Recording Medium

Reference is now made to FIGS. 2A, 2B, 4 and 5, in particular, where detailed attention is to be accorded to the Case 1 where the index of refraction of the substrate $n_s$ is less than the index of refraction of the recording medium $n_m$. Under such optical conditions, the holographic recording may be realized using any conventional holographic recording medium, such as silver halide or a photopolymer (e.g. the HRF 352, HRF 300×006, and HRF 700×071 photopolymers) commercially available from DuPont. The substrate may be realized using an optically transparent material, such as glass or plastic, having an index of refraction that is (i) functionally related to the index of refraction of the selected recording medium and (ii) the reference beam angle required in the particular application at hand. The precise specification of the indices of refraction for the recording medium and substrate is central to the method of the present invention and will be described in detail below.

As best shown in FIG. 2A, when using a thin substrate a considerable restriction is imposed on the angle of attack of the incoming reference beam measured with respect to the interface between the substrate and the recording material. The angle $\phi_s$ is on the order of that given by the relationship:

$$\tan\phi_s = \frac{L}{t} \quad (12)$$

where L is the length of the substrate and t its thickness. The amplitude of light transmitted across the interface (i.e., defined between the substrate and overlaid recording layer) is given by the relationship:

$$\frac{A_t}{A_i} = \frac{2\sin\phi_m \cos\phi_s}{\sin(\phi_m + \phi_s)} \quad (13)$$

where $A_t$ is the amplitude of the light transmitted at the interface, $A_i$ is the amplitude of the light incident at the interface, and $\phi_s$ and $\phi_m$ are the angles with respect to the normal to the interface in the substrate and medium, respectively. This equation is then combined with Snell's Law, $$n_m \sin \phi_m = n_s \sin \phi_s \quad (14)$$

where $n_s$ and $n_m$ are defined above.

As shown in the ray diagram of FIG. 4 (where $n_m > n_s$), the light rays 6A of the reference beam having incident amplitude $A_i$, travel through the substrate 12 and strike interface 15 at an angle $\phi_s$ with respect the normal, and are refracted into recording medium 13. The transmitted rays 17 travel in recording medium 13 at angle $\phi_m$ and with transmitted amplitude $A_t$. Thus, using the relations of FIG. 4 and the symbolic expressions developed above, Equation (13) can be re-expressed in the form:

$$\frac{A_t}{A_i} = \frac{\left(\frac{2n_s}{n_m}\right)}{\sqrt{1 + \frac{2\Delta n}{n_s}\tan^2\phi_s} + \frac{n_s}{n_m}} \quad (15)$$

where $n_m = n_s + \Delta n$ and $\Delta n$ is regarded as small enough. This expression reveals that unless the criterion $$2\frac{\Delta n}{n_s}\tan^2\phi_s << 1 \quad (16)$$

is satisfied, then as $\phi_s$ approaches p/2, the light transmittance from the substrate into the recording medium drops to zero. Since the values of tan $\phi_s$ is restricted by the relationship tan $\phi_s = L/t$, the above criterion can be written in the form:

$$\Delta n << \frac{n_s}{2}\left(\frac{t}{L}\right)^2 \quad (17)$$

Significantly, this criterion sets a stringent demand on refractive index matching required during the holographic recording process when the refractive index of the recording medium is greater than the refractive index of the substrate (i.e., Case 1).

Then, using Fresnel's relations for S-mode polarization and Snell's Law, the intensity transmittance T of the reference beam into the recording medium at angle of incidence $\phi_s$ can be shown to be proportional to the factor:

$$T = \frac{4\sin^2\phi_m \cos^2\phi_s}{\sin^2(\phi_m + \phi_s)} \quad (18)$$

Figure 5:
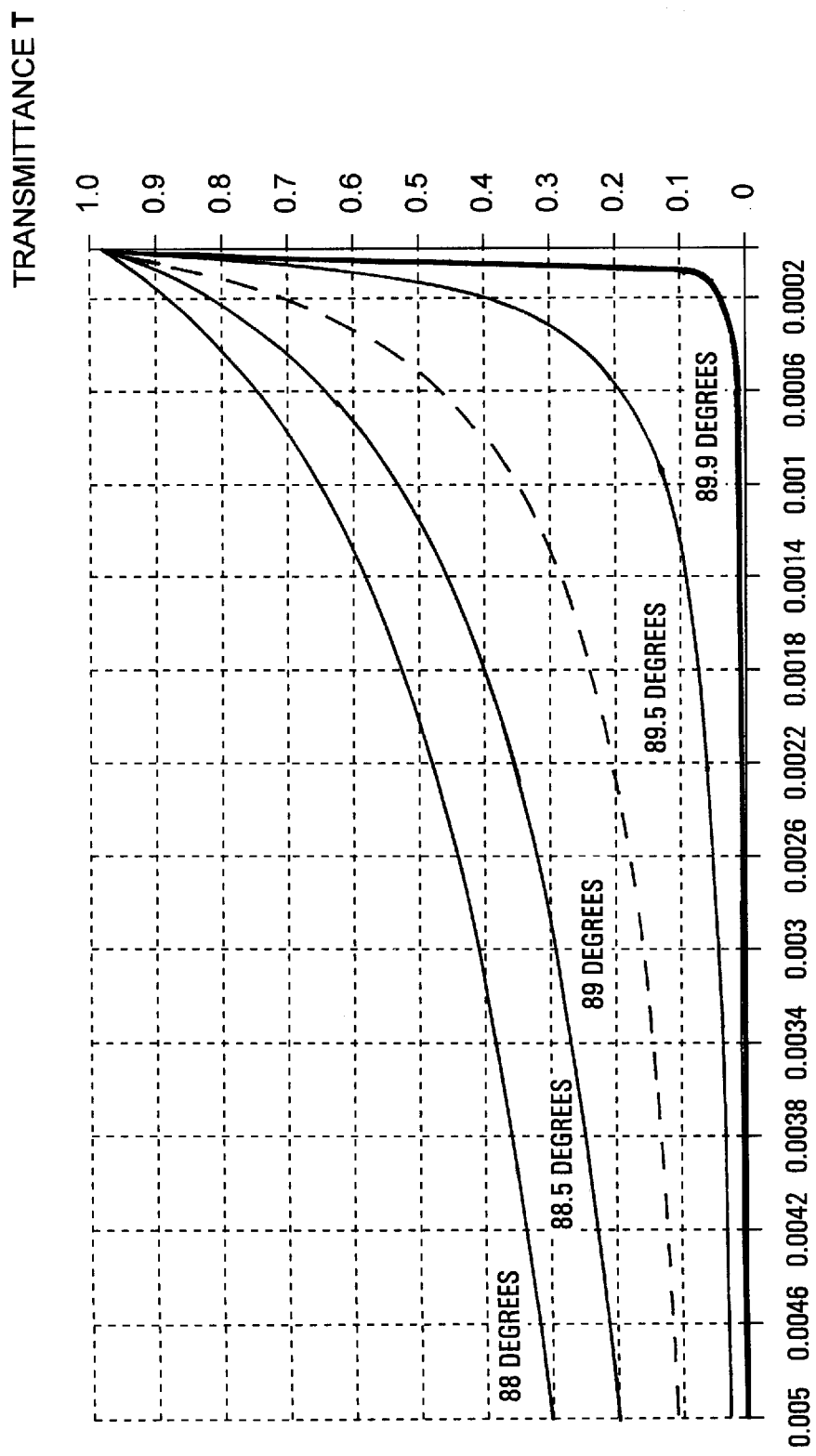
FIG. 5 is a set of functions (i.e., plots) relating (i) the difference in index of refraction $\Delta n$ between the recording medium and recording substrate and (ii) the intensity of light from laser reference beam transmitted through the hologram substrate into the recording medium, for a set of laser reference beams approaching different angles of grazing incidence (i.e., parallel to the interface between the substrate and the recording medium interface)

The functions plotted in the exemplary data table of FIG. 5 have been computed for five exemplary grazing incidence reference angles $\phi_s$ using (1) Equations 4 and 18, (2) Snell's Law, and (3) a set of $\phi_n$ values derived from (i) indices of refraction for the substrate $n_s$ starting at 1.49 and approaching 1.495, and (ii) a fixed index of refraction for the recording medium $n_m = 1.495$. Notably, the set of functions set forth in FIG. 5 show that a functional relationship exists among (i) the transmitted intensity of the reference beam across the substrate-medium interface, (ii) the difference in index of refraction $\Delta n$ between the substrate and the recording medium, and (iii) the angle of incidence of the reference beam with respect to the substrate-medium interface. In less than ideal circumstances (i.e., $n_s \neq n_m$), this functional relationship provides a solution to the problem of coupling a reference beam into the recording medium at steep angles of incidence, as required in the restrictive geometry of most grazing incidence holograms.

A key fact revealed by the set of functions set forth in FIG. 5 is that, when $n_m > n_s$ (i.e., Case 1), light will couple reasonably efficiently (from the substrate) into the recording medium at angles $\phi_s$ approaching grazing incidence by simply choosing the refractive index of the substrate $n_s$ to be below that of the recording material by an amount specified by the functional relationship embodied between Equation (18) and Snell's Law.

Figure 6:
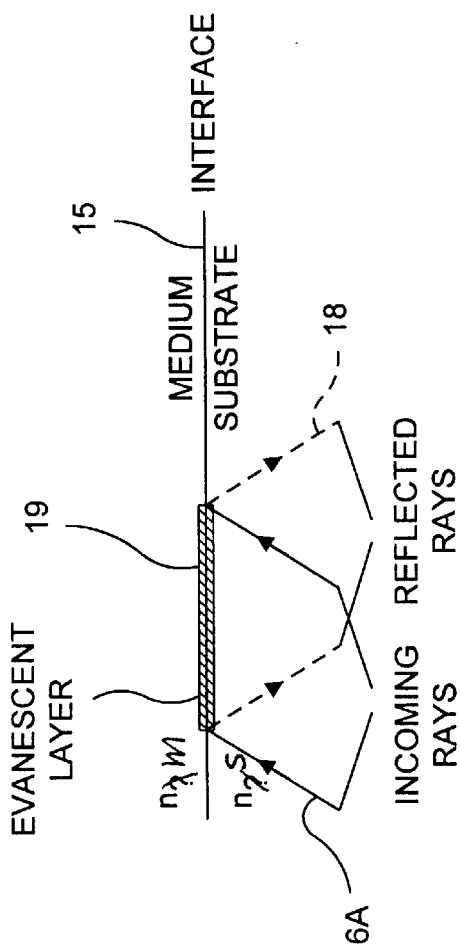
FIG. 6 is a schematic diagram illustrating that during the holographic recording process of the present invention, an evanescent layer is created at the recording medium-substrate interface by the reflection of light from the reference laser beam when the index of refraction of the recording substrate is greater than the index of refraction of the recording medium ($n_s > n_m$)
Figure 7:
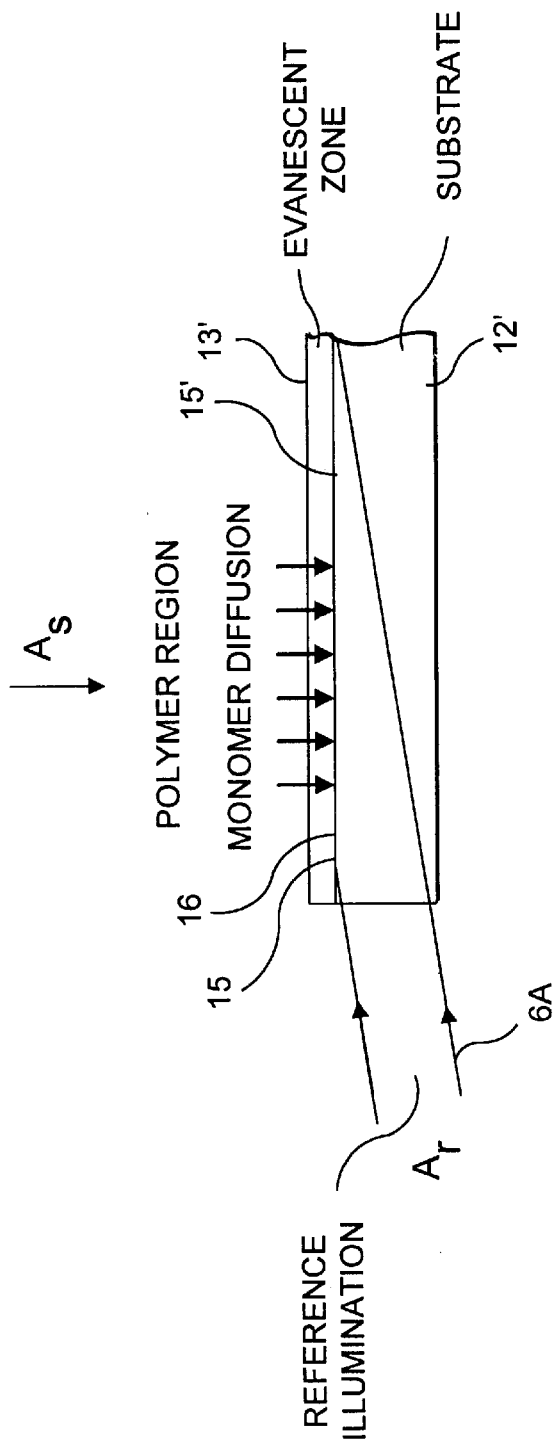
FIG. 7 is a schematic diagram illustrating the self-induced index matching phenomena carried out in a self-imaging type photopolymeric recording medium during the recording process of the present invention, where the index of refraction of the recording substrate is greater than the index of refraction of the recording medium ($n_s > n_m$), as indicated in FIG. 7.
Figure 8:
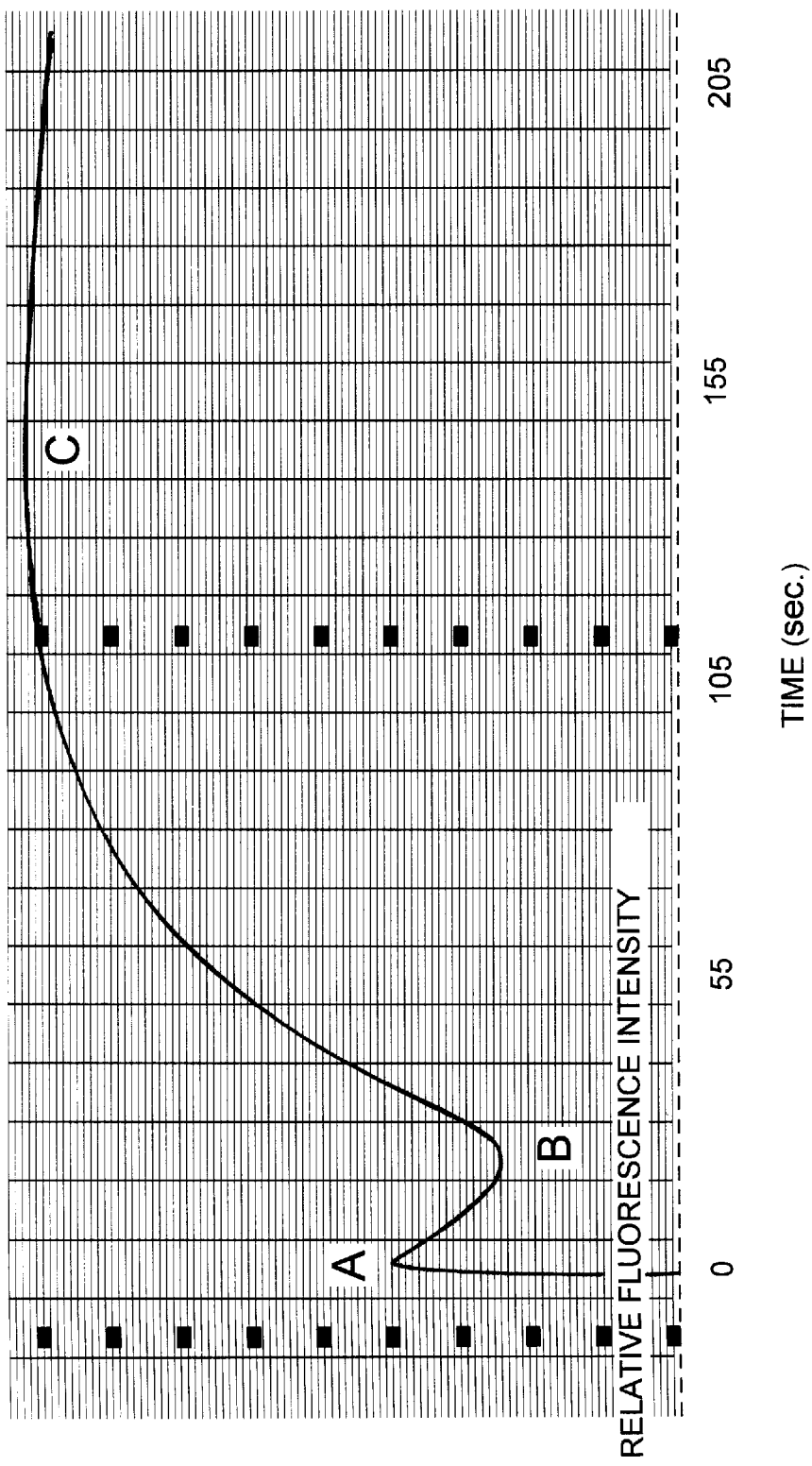
FIG. 8 is a schematic representation of the relative fluorescence intensity as a function of time, which can be used to measure the exposure and determine when the creation of a gradient-type indexing matching regions is completed.

Referring to FIGS. 6, 7 and 8 in particular, detailed attention is now accorded to Case 2 where the index of refraction of the edge-illuminated substrate $n_s$ is greater than the index of refraction of the recording medium $n_m$. In this second case, the situation is much more subtle. Once the angle of incidence $\phi_s$ exceeds the critical angle, given by the expression:

$$\sin\phi_s = \frac{n_m}{n_s} \tag{19}$$

then total internal reflection occurs and the light fails to enter the recording medium. Moreover, under such optical conditions, an evanescent layer is created just inside the interface in the recording medium. This effect is well known and is described in a detailed study in the article entitled "Evanescent Waves in Optical Imaging" by Bryngdahl, published in Progress in Optics, Vol. XI, Ed. E. Wolf, North Holland, 1973.

FIG. 7 illustrates the evanescent layer is formed by reflection of the reference beam which is incident from the denser medium, i.e., the substrate, where $n_s>n_m$. As shown, incoming rays from the reference beam 6A strike the interface 15 between the substrate 12 and the recording medium 13, giving rise to reflected rays 18 and evanescent layer 19. The penetration depth of the evanescent field depends on the angle of incidence $\phi_s$ and in essence, decreases as $\phi_s$ decreases. The reflected light is subject to a spatial shift, known as the Goos-Hanchen shift, described in detail in Bryngdahl's paper. Detailed calculation shows that $$\lambda_p = \frac{\lambda_a}{(n_s^2\sin^2\phi_s - n_m^2)^{\frac{1}{2}}} \tag{20}$$

where the evanescent wave amplitude falls off in accordance with the exponential function:

$$\exp\left(-\frac{2\pi z}{\lambda_p}\right) \tag{21}$$

where $\lambda_p$ is a penetration parameter, $\lambda_a$ is the air wavelength and z is a coordinate normal to the interface.

Using the above relationships, Expression (20) can be rewritten in approximate form as follows:

$$\lambda_p = \frac{\lambda_a}{\left[(n_m^2 + 2n_m\Delta n)\left(\frac{L^2}{t^2+L^2}\right) - n_m^2\right]^{\frac{1}{2}}} \tag{22}$$

where $\Delta n = n_s - n_m$. Since $\Delta n << n$, Equation (22) above can be written in the form $$\lambda_p = \frac{\lambda_a\sqrt{t^2+L^2}}{\sqrt{2n_m\Delta nL^2 - n_m^2 t^2}} \tag{23}$$

which can be approximated by:

$$\approx \frac{\lambda_a L}{\sqrt{2n_m\Delta nL^2 - n_m^2 t^2}} \tag{24}$$

Letting $\Delta n$ go to zero (i.e., $\Delta n \rightarrow 0$) from above zero, the penetration of the evanescent layer into recording medium is perfect for the condition where:

$$d_x = \frac{\lambda_m}{|\sin\theta_S - \sin\theta_R|} \tag{25}$$

The above concepts are fundamental to the process of reference beam coupling (i.e., transmission) at the substrate-medium interface when $n_s>n_m$.

In the illustrative embodiment of the present invention, the Case 2 recording system analyzed above is carried out using photopolymer recording medium 13' disposed on a substrate 12', as shown in FIG. 7. The refractive index $n_m$ of the photopolymer recording medium is chosen to be slightly less than the bulk refractive index of the substrate, $n_s$. The photopolymer recording medium 13' comprises a photopolymerizable monomer having a lower index of refraction than the polymer component which functions as the recording medium. With this recording system, edge-illuminated holograms are made using a grazing incidence, one pass, reference beam.

The holographic recording method for Case 2 recording conditions (i.e., $n_s>n_m$) was carried out in the laboratory using photopolymers (e.g. HRF 352, HRF300×006 and HRF700×071) from Du Pont's Optical Element Venture Group as the holographic recording medium 13'. This photopolymer has a bulk refractive index of approximately 1.5. Various types of edge-illuminatable substrates 12' including, for example, silica, acrylic, BK7 and BK10 glasses, were used to successfully practice this method of the present invention. In particular, it has been found that the refractive indices of DuPont's HRF-352 photopolymer and BK10 glass are very well matched for use in recording grazing incidence volume holograms. DuPont's photopolymers have been found to be ideal recording materials due to their low scatter and useful modulation indices.

During the recording process, laser light exposure times of a few tens of seconds, usually about half a minute or so, were sufficient to expose the various DuPont photopolymers and the substrates described above. As the collimated input reference beam 6A generates the evanescent layer 16 during the exposure process, this region glows due to the progressive increase in fluorescent light produced from the sensitizing dye in the photopolymer recording layer 13'. As illustrated in FIG. 7, the evanescent layer 16 encourages monomer in the photopolymer to diffuse towards the evanescent layer, and this monomer polymerizes therein, thereby increasing the refractive index in the photopolymer adjacent to the interface 15'.

The total fluorescence of the film greatly depends on the volume of film which is exposed. This phenomenon enables one to detect the conditions of precise index matching for the reference beam coupling from the substrate to the film. In the initial stage of recording, a Total Internal Reflection (TIR) situation exists and the reference beam is only penetrating into the film layer slightly according to the transverse Goos-Hänchen shift. The fluorescence from this initial penetration actually decreases due to the dye molecules breaking down or "bleaching." However, this only occurs in the evanescent layer. This penetration depth is sufficient enough to allow for the monomer to diffuse therein increasing the local refractive index in the area of the reference penetration, and thus allowing further penetration because the conditions of TIR have changed. The plane of TIR would effectively be moving in the $-y$ direction (opposite to the direction of diffusion). This self-induced gradient index matching is indicated by a dramatic increase in fluorescence, thereby allowing one to determine when precise index matching has been achieved at the interface and thus when laser exposure can be ceased to avoid oversaturating the recording film.

The schematic representation of FIG. 8 shows the increase in fluorescence produced from a constant intensity reference beam over a duration of 215 seconds. This characteristic has been produced using the holographic recording system of FIG. 1A, without a signal (i.e. object) beam passed through the recording film, and with the detector placed behind the recording film, instead of the black light dump. As illustrated in FIG. 8, the exposure process begins at point A; most of the monomer diffusion begins at point B; and the reference signal begins to penetrate through the recording film until point C, when the fluorescence begins to saturate and gradually falls off due to dye-bleaching. During this exposure process, the hologram (i.e., slanted-fringe pattern) blooms in the recording medium as the refractive index at the interface in the photopolymer rises to match that of the substrate. This phenomenon of gradient index-matching permits a novel and effectively unique way of achieving local optimization of reference light (beam) transmittance at the interface 15' between the recording layer 13' and the substrate.

With regard to the above-described index matching technique, Applicants have discovered a way to conserve some of the dynamic range of the index modulation of the recording medium for recording slanted fringe structure therein and thus increase the light diffraction efficiency of the resulting hologram.

In Case 2 recording scenarios, such index modulation conservation is achieved by allowing the object beam into the recording medium only when the gradient-type indexing matching region has been formed, (i.e. when fluorescence increases greatly). It has been discovered that allowing the object beam into recording medium (e.g. HRF 700×071 photopolymer on FK5 glass) prior to the formation of the gradient-type index matching region, only results in fogging the recording medium. The characteristic of FIG. 8 can be used to determine when the object beam should be allowed to enter the recording medium.

In Case 1 recording scenarios, however, fluorescence of the photopolymer attains its maximum intensity immediately upon the reference beam entering the Recording substrate, and thereafter gradually drops off, in contrast with the intensity versus time characteristics for Case 2 recording situations, shown in FIG. 8. Consequently, in Case 1 recording situations, the object beam should be immediately allowed to enter the photopolymer (eg. HRF 700×071 film on Fused Silica) at the same time the reference beam is allowed to enter the same. This exposure technique will ensure that the dynamic range of the index modulation of the photopolymer is conserved for recording slanted fringe structure therein.

For the above-described process of gradient index matching to be useful, the original indices of the substrate and photopolymer should be very closely matched (e.g. using the index matching technique disclosed herein for Case 1 recording situations). If these refractive indices are not closely matched prior to the gradient indexing matching process, then the dynamic range of the index modulation within the recording film will be used for reference signal penetration, while little dynamic range for producing slanted fringe structure within the hologram. For the class of photopolymers used in carrying out the illustrative embodiments of the present invention, the refractive index change $\Delta n$ achievable in the photopolymer is approximately greater that 0 and less than or equal to 0.07. Consequently, the change in refractive index over the gradient index matching region (i.e. between the recording medium and the substrate) can be made to vary by this amount.

Recording and Replaying Grazing Incidence Holograms Using a Complementary System While edge-illuminable holograms are highly desired from the stand-point of geometrical compactness during hologram playback, there exists a great need for an alternative system and method for recording grazing-incidence holograms without the constraints imposed by the holographic recording arrangement shown in FIGS. 2A and 2B. As will be shown below, this alternative system and method can be developed by first describing the slanted-fringe structure of a grazing-incidence hologram using an appropriate geometrical optics model, and then using this model to arrive at a set of conditions which a complementary holographic recording and playback system must satisfy in accordance with the principles of the present invention.

As is well known, the fringes of an edge-referenced hologram are formed by the interference of a reference beam incident on the recording medium at angle $\theta_r$ and an object beam incident on the recording medium at angle $\theta_s$. The interference of these beams spatially modulates the bulk refractive index of the recording medium in accordance with the resulting interference pattern. The interference creates, in effect, a slanted fringe structure in the recording medium. The spacing between the slanted fringes (i.e. the fringe spacing) measured in the x-direction of the recording medium can be denoted as $d_x$ and is given by the mathematical expression:

$$d_x = \frac{\lambda_m}{|\sin\theta_S - \sin\theta_R|} \quad (26)$$

In order to obtain an expression for this parameter in terms of the wavelength measured in air, the relation $\lambda_m = \lambda a/n$ can be used to rewrite the above expression as follows:

$$d_x = \frac{\lambda_a}{n(|\sin\theta_S - \sin\theta_R|)} \quad (27)$$

Using this expression, the absolute fringe spacing, $\Lambda = d_x \cos\phi$ can be expressed as:

$$\Lambda = \frac{\lambda_a \cos\phi}{n(|\sin\theta_S - \sin\theta_R|)} \quad (28)$$

where the "fringe angle" is defined as:

$$\phi = \frac{\theta_S + \theta_R}{2} \quad (29)$$

Then using the trigonometric identity $$\sin\alpha - \sin\beta = 2\cos\frac{1}{2}(\alpha+\beta)\sin\frac{1}{2}(\alpha-\beta), \quad (30)$$

and performing some elementary algebraic operations, the "fringe spacing" $\Lambda = d_x \cos\phi$ can be rewritten in terms of the wavelength of the reference and object beams in air $\lambda a$ and the recording angles $\theta_r$ and $\theta_s$ thereof, as follows:

$$\Lambda = \frac{\lambda_a}{2n\left|\sin\left[\frac{1}{2}(\theta_S - \theta_R)\right]\right|} \quad (31)$$

The mathematical Expressions (29) and (31) above define the relations among principal characteristics of the slanted-fringe structure of a grazing-incidence hologram. If one were to make the same hologram using two different recording systems, then it is clear that the hologram must have the same fringe spacing and fringe angle. Therefore expressions (29) and (31) must hold among such recording arrangements to ensure equivalence (i.e. $\Lambda_1 = \Lambda_2$, and $\phi_1 = \phi_2$), where subscripts 0 and 1 designate indices for the first and second complementary recording systems.

Using Expressions (29) and (31) and the grating equation, the following relation can be derived for the two holographic recording systems:

$$\frac{\lambda_{a1}\cos\phi_1}{n(\sin\theta_{S1}-\sin\theta_{R1})} = \frac{\lambda_{a2}\cos\phi_2}{n(\sin\theta_{S2}-\sin\theta_{R2})} \qquad (32)$$

Since the fringe angles must be the same for the holograms made using the two complementary systems, the above expression can be reduced to:

$$\lambda_{a2} = \left(\frac{\sin\theta_{S2}-\sin\theta_{R2}}{\sin\theta_{S1}-\sin\theta_{R1}}\right)\lambda_{a1} \qquad (33)$$

By recognizing that the Principle of Reciprocity applies to each of these different recording arrangements, a significant logical step can be made, namely: that one of these geometrical arrangements can be used to record an edge-referenced hologram using the set of construction parameters specified by $\{\theta_{R1}, \theta_{S1}, \lambda_1\}$, while the other geometrical arrangement can be used to replay the edge-referenced hologram using at the set of reconstruction parameters specified by $\{\theta_{R2}, \theta_{S2}, \lambda_2\}$. As will become apparent hereinafter, this discovery reveals that there exists an opportunity to record a slanted-fringe volume hologram under a set of conditions which are both favorable and easy to satisfy in most recording environments, and yet replay them under a different set of conditions which are favorable and easy to realize in desired playback environments.

Figure 9:
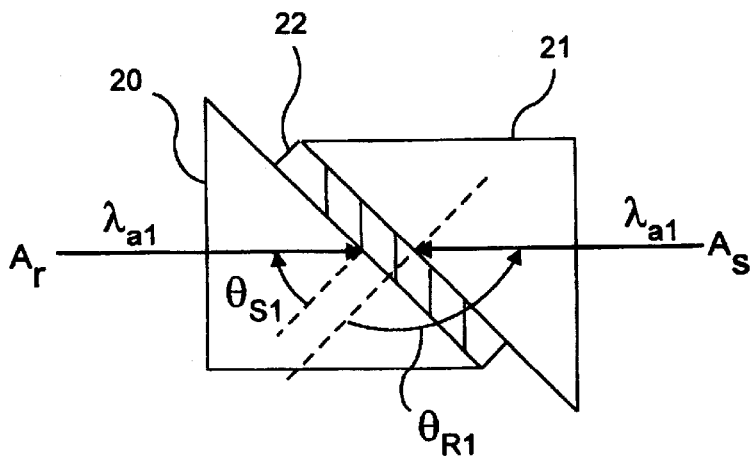
FIG. 9 is a schematic diagram illustrating the recording of a reflection-type slanted-fringe hologram using a recording system of the present invention, in which the reference beam is delivered to the recording medium by way of a first prism, while the object beam is delivered to the recording medium by way of a second prism, displaced laterally from the first prism.
Figure 10:
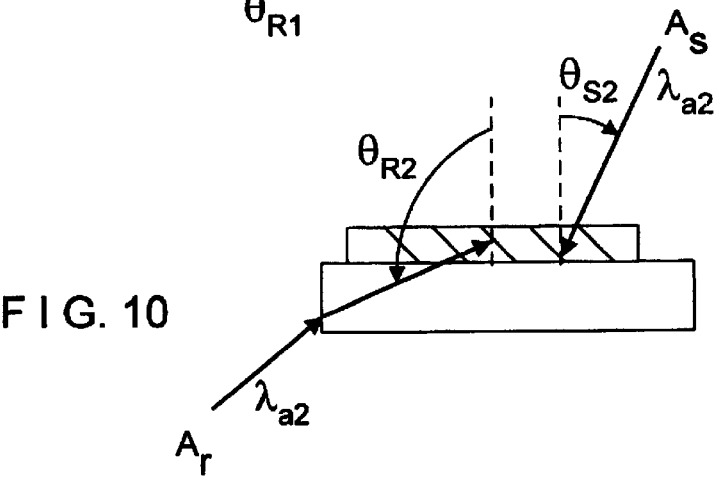
FIG. 10 is a schematic diagram illustrating a system for playing back the reflection-type slanted-fringe hologram recorded using the system of FIG. 9.
Figure 12A:
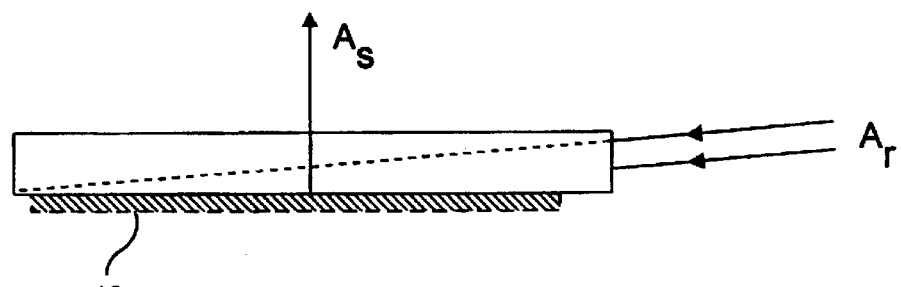
FIG. 12A is a schematic diagram illustrating a system for playing back a reflection-type slanted-fringe hologram constructed according to the principles of the present invention.
Figure 12B:
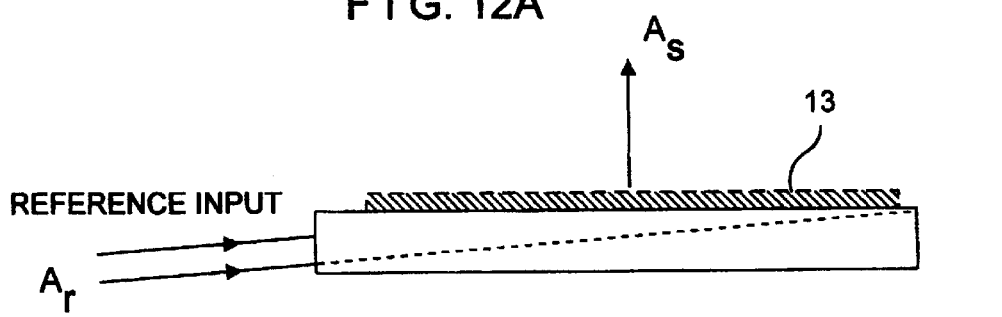
FIG. 12B is a schematic diagram illustrating a system for playing back a transmission-type slanted-fringe hologram constructed according to the principles of the present invention.

Consistent with the above geometrical optics model, a novel recording arrangement is disclosed in FIG. 9 for use with the recording systems of FIG. 1A, while FIG. 10 provides a complementary replay arrangement for edge-referenced holograms recorded using the recording arrangement of FIG. 9. Notably, Expression (33) above describes the relations that must hold between these holographic recording and playback arrangements in accordance with the above-developed geometrical optics model. Provided that the conditions defined by Expression (33) are satisfied, the novel recording arrangement of FIG. 9 can be used to record an edge-referenced volume hologram using the set of construction parameters $\theta_{R1}$, $\theta_{S1}$, $\lambda_1$, and then the playback system of FIG. 10 can be used to replay back the edge-referenced volume hologram using the set of replay parameters $\{\theta_{R2}, \theta_{S2}, \lambda_2\}$.

In the recording arrangement shown in FIG. 9, a pair of prisms 22 and 21 are used to record slanted fringes within the recording medium layer 23 using the construction parameters $\{\theta_{R1}, \theta_{S1}, \lambda_1\}$. For convenience, 45 degree prisms are preferably used in the system of FIG. 9. Notably, with this recording arrangement, the angles $\theta_r$ and $\theta_s$ can be changed independently to provide the desired fringe angle and spacing of the hologram under construction. In this recording system, the beam ratio (i.e. $A_R/A_S$) is optimized as described hereinabove in order to maximize the light diffraction efficiency of the hologram at its Bragg angle.

In practice, the prism-based recording system of FIG. 9 is realized as a part of the holographic recording system of the type illustrated in FIG. 1A. The recording system need not satisfy the strict index matching requirements of the recording arrangements shown in FIGS. 2A and 2B. Preferably, the incident reference and object beams entering the prisms have very large radius of curvature. The prisms will be held in particular relation to the recording medium so that the construction parameters are realized during recording. Suitable support structures will be used to support the prisms relative to the optical bench of the recording system. Reference and object beam forming optics will be realized on the optical bench using conventional apparatus and techniques.

In mass-production applications, the recording system of FIGS. 9 (and 1A) can be realized as a high-speed holographic recording machine comprising computer-controlled equipment for moving the prisms relative to the recording medium which can be supported on a recording substrate carried by a support platform, a rotatable/translatable relative to the optical bench. Exposure control in the Case 1 scenario can be realized using a light detector and a controller to commence and cease exposure. Preferably, such a system will also include means for realizing the Beam Ratio Optimization technique described above.

In the complementary playback arrangement shown in FIG. 10, a reference beam of wavelength $\lambda_b$ is used to illuminate (at grazing incidence angles) the edge of the substrate upon which the hologram is supported during replay, permitting reconstruction of the object beam wavefront. The angle of the object beam is determined by Expression (33). When using this geometrical playback arrangement, the index of refraction of the substrate is preferably matched to the hologram (i.e. exposed/developed recording medium) using the same refractive index matching techniques described hereinabove.

The above-described recording/playback arrangement has several important advantages over prior art systems. In particular, it permits use of a larger wavelength laser (e.g. a Krypton laser of wavelength 647 nm) and shallow reference angles during recording, while permitting the use of a commercially available red laser diodes and desired steep reference angles during replay.

Also during recording, prisms 20 and 21 and FIG. 9 make it easier to deliver reference and object beams to the recording medium in a manner which effectively ensures that the spatial intensity of both the reference and object beams are substantially uniform over the entire region of concern within recording medium. This feature ensures high uniformity in fringe contrast when recording fixed spatial-frequency light diffractive gratings. Also, while the recording system of FIG. 9 provides an improved way to record reflection-type, grazing-incidence volume holograms, such holograms can be replayed in either the transmission or reflection mode. Other advantages of this system will become readily apparent to those skilled in the art.

Considerations in Recording Slanted-Fringe Volume Holograms

There are numerous embodiments of the system and process for recording slanted-fringe volume holograms according to the principles of the present invention disclosed herein. Firstly, there is in a different geometry system for recording transmission and reflection type holograms, as illustrated in FIGS. 1A and 1B. For each of these illustrative embodiments, there are two different techniques for optimally matching the indices of refraction of the recording medium and the substrate (i.e. Case 1 and Case 2). Given a hologram-type and indexing-matching technique, the complementary recording/playback arrangement and beam ratio optimization technique described above can be used to record and playback slanted-fringe volume holograms having ultra-high fringe contrast.

When recording edge-referenced holograms under Case 1 conditions, the set of characteristic plots set forth in FIG. 5 can be used to achieve optimal light-coupling into the recording media at steep reference angles. When recording edge-referenced holograms under Case 2 conditions, gradient index matching technique is used to form a gradient-type index at the substrate-recording media interface. The "fluorescence intensity versus time" characteristic shown in FIG. 8 can be used to determine (i) when the maximum level of exposure has been achieved for optimal modulation depth (i.e. fringe contrast) in the recording media recordings, and (ii) when the optimal gradient index matching has been realized at the interface of the recording media and the supporting substrate.

Figure 11:
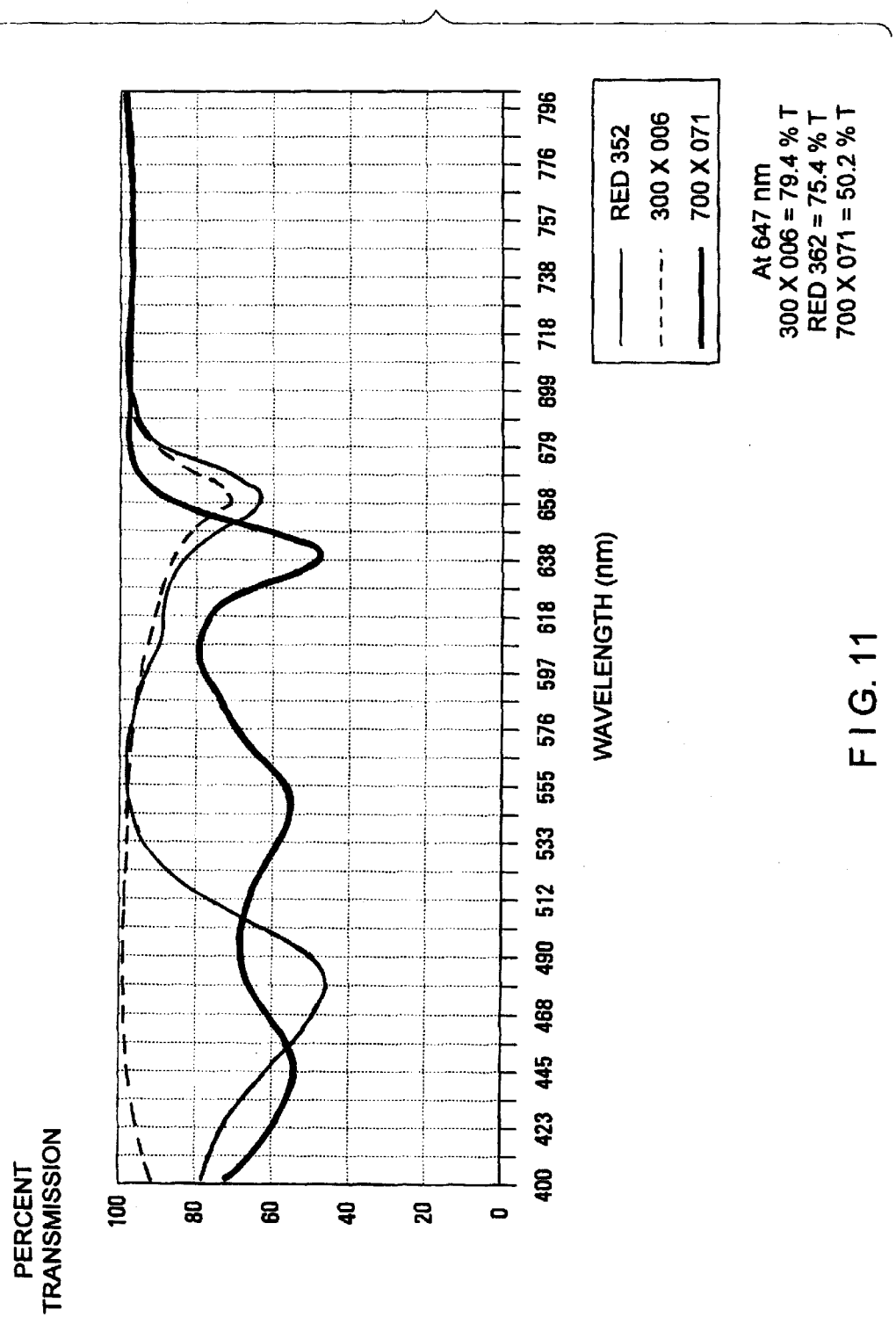
FIG. 11 is a schematic representation of the transmission curves for three types of red-sensitive DuPont photopolymers used during the practice of the holographic recording process of the present invention.

In order to maximize the fringe contrast of the edge-referenced holograms using the system and process of the present invention, sensitization information and absorption coefficients can be obtained from the transmission curves associated with the photopolymer recording media, which for the above-referenced DuPont photopolymer films, are set forth in FIG. 11 for illustrative purposes. For example, with a 60% transmission factor at 647 nm, an absorption coefficient for the HRF 700×071 photopolymer was deduced as $\alpha=0.0127$ $\mu m^{-1}$. In the illustrative embodiments of the present invention, the internally measured angle of incidence used to record the holograms was selected to be $\theta=78°$ (i.e. measured in the recording medium). Using Expression No. 12 derived above, the theoretical optimal beam ratio was determined to be 2.6:1, and that under those conditions, the average fringe contrast in the resulting edge-referenced hologram was computed to be 0.92.

Figure 13:
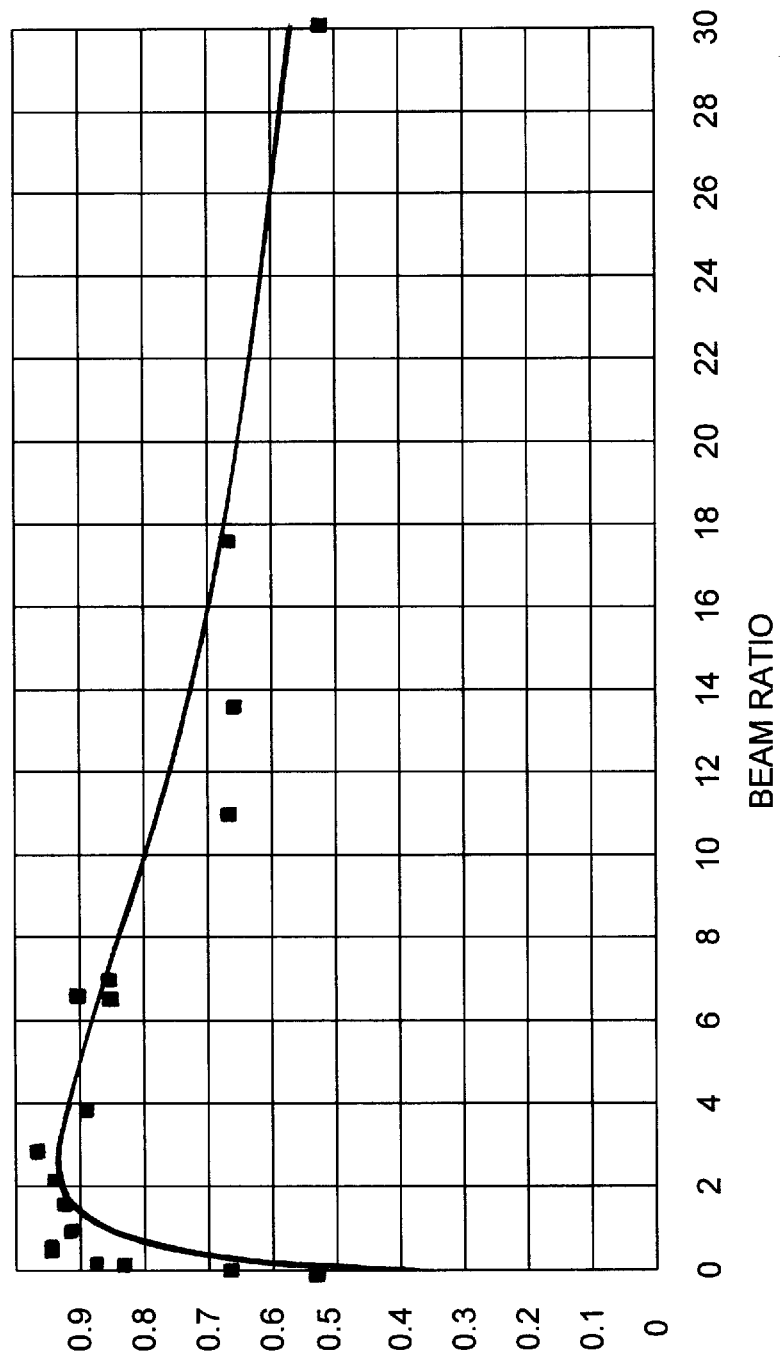
FIG. 13 is a schematic representation illustrating both the theoretical and actual light diffraction efficiencies of edge-illuminated holograms (measured on Bragg) recorded using different beam ratios during the holographic recording process of the present invention.

As expected, the measured light diffraction efficiency (on Bragg) versus Beam Ratio for edge-referenced holograms made using the various DuPont photopolymers described above, closely matched that predicted by the theoretical model developed hereinabove. Both the actual and theoretical light diffraction efficiency characteristics are plotted in FIG. 13, showing a very strong correlation between theory and practice of the present invention.

Figure 14:
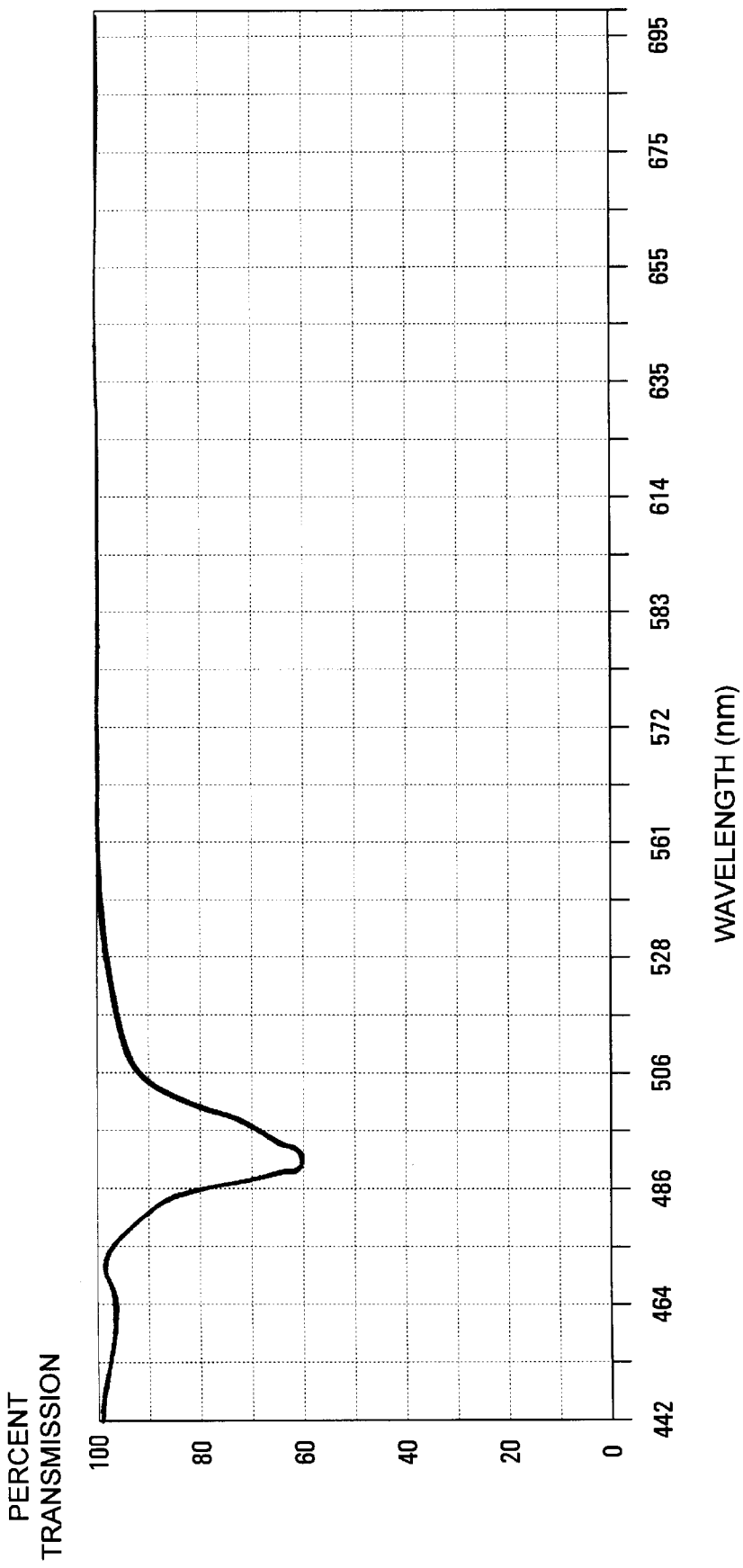
FIG. 14 is a schematic representation illustrating the transmission spectrum of an edge-illuminated hologram recorded using the geometrical arrangement illustrated in FIG. 9.

The transmission spectrum of a slanted-fringe volume hologram recorded with the arrangement of FIG. 9 is graphically illustrated in FIG. 14. Notably, this transmission characteristic was obtained by viewing the hologram during playback at normal incidence (i.e. replaying at $\theta_s=0°$). As shown in FIG. 14, the hologram exhibited a transmission minimum at 490 nm, corresponding to a reflection of light from the hologram at $\theta_{R2}=98.3°$ out of the edge of the substrate and away from the detector used during measurement.

While the particular illustrative embodiments of holographic system and method shown and described above will be useful in many applications, further modifications to the present invention will occur to persons with ordinary skill in the art. All such modifications are deemed to be within the scope and spirit of the present invention defined by the appended Claims to Invention.

What is claimed is:

1. A grazing incidence holographic recording having slanted fringes recorded therein, comprising:

a substrate of thin construction, having an index of refraction of $n_s$, front and rear surfaces disposed substantially parallel to each other, and an edge surface disposed between said front and rear surfaces; and a hologram made from an optically transparent material having a bulk index of refraction $n_M$ less than $n_S$, front and rear surfaces and fringes prerecorded therein, and said rear surface of said hologram being disposed in contact with the front surface of said substrate along an interface of substantially planar geometry having a gradient-type index matching region.

2. A holographic recording process comprising:

(a) supporting a recording medium upon a recording substrate so that an interface is established therebetween, said recording medium containing photopolymerizable monomers that are free to migrate within said recording medium in response to light exposure and the index of refraction of said recording medium $n_m$ being less than the refractive index of said recording substrate $n_s$, (b) exposing said recording medium to a reference beam passing directly through said recording substrate at grazing incidence to the interface defined between said recording medium and said recording substrate, whereupon an evanescent wave is produced at said interface, causing said monomers in said polymerizable recording medium to migrate towards said interface, locally increasing the index of refraction adjacent said interface, and creating a gradient-type index matching region between said recording medium and said recording substrate; and (c) exposing said recording medium to an object beam from one side thereof, and simultaneously to a reference beam passing directly through said recording substrate at grazing incidence to the interface defined between said recording medium and said recording substrate, and allowing said reference beam to enter said recording medium and interact with said object beam to create a fringe pattern fixable within said recording medium.

3. The holographic recording process of claim 2, which further comprises (c) fixing said fringe pattern, thereby forming a hologram.

4. A holographic recording system comprising:

means for supporting a recording medium upon a recording substrate so that an interface is established therebetween, said recording medium containing photopolymerizable monomers that are free to migrate within said recording medium in response to light exposure and the index of refraction of said recording medium being less than the refractive index of said recording substrate, means for exposing said recording medium to a reference beam passing directly through said recording substrate at grazing incidence to the interface defined between said recording medium and said recording substrate, whereby an evanescent wave is produced at said interface, causing said monomers in said polymerizable recording medium to migrate towards said interface, thereby locally increasing the index of refraction adjacent said interface, and creating a gradient-type index matching region between said recording medium and said recording substrate; and means for exposing said recording medium to an object beam from one side thereof and simultaneously to a reference beam passing directly through said recording substrate at grazing incidence to the interface between said recording medium and said recording substrate, and allowing said reference beam to create a fringe pattern fixable within said recording medium.

5. The holographic recording system of claim 4, which further comprises means for fixing said fringe pattern, thereby forming a hologram.

* * * * *